United States Patent [19]

Wilder

[11] Patent Number: 4,642,813

[45] Date of Patent: Feb. 10, 1987

[54] ELECTRO-OPTICAL QUALITY CONTROL INSPECTION OF ELEMENTS ON A PRODUCT

[75] Inventor: Joseph Wilder, Princeton, N.J.

[73] Assignee: Object Recognition Systems, Inc., Princeton, N.J.

[21] Appl. No.: 486,245

[22] Filed: Apr. 18, 1983

[51] Int. Cl.$^4$ .............................................. G06K 9/00
[52] U.S. Cl. ......................................... 382/8; 382/22; 358/101; 358/106
[58] Field of Search ................... 382/8, 22, 48, 53, 83; 358/101, 106, 261

[56] References Cited

U.S. PATENT DOCUMENTS

| | | | |
|---|---|---|---|
| 4,072,928 | 2/1978 | Wilder | 340/146.3 H |
| 4,110,736 | 8/1978 | Kono | 382/25 |
| 4,319,269 | 3/1982 | Kajiura et al. | 358/106 |
| 4,344,146 | 8/1982 | Davis, Jr. et al. | 364/552 |
| 4,481,665 | 11/1984 | Ota | 382/48 |
| 4,501,016 | 2/1985 | Persoon et al. | 382/53 |

Primary Examiner—David K. Moore
Assistant Examiner—Jacqueline Todd
Attorney, Agent, or Firm—Carl V. Olson

[57] ABSTRACT

Apparatus for the quality control inspection of a product (such as a computer keyboard or a printed circuit board) consisting of an array of elements (such as keys or shapes) each having at least one identifying graphic pattern. A video camera views the elements one at a time in sequence. A predetermined electronic window surrounds each graphic pattern on each element. Edge signals representing the vertical and horizontal edges of a graphic pattern on an element are derived from the video signal during scan through the window surrounding the pattern. The edge signals are transformed to data-reduced feature signals which are compared with similar signals from a prototype key to determine whether the patterns represented thereby match.

18 Claims, 14 Drawing Figures

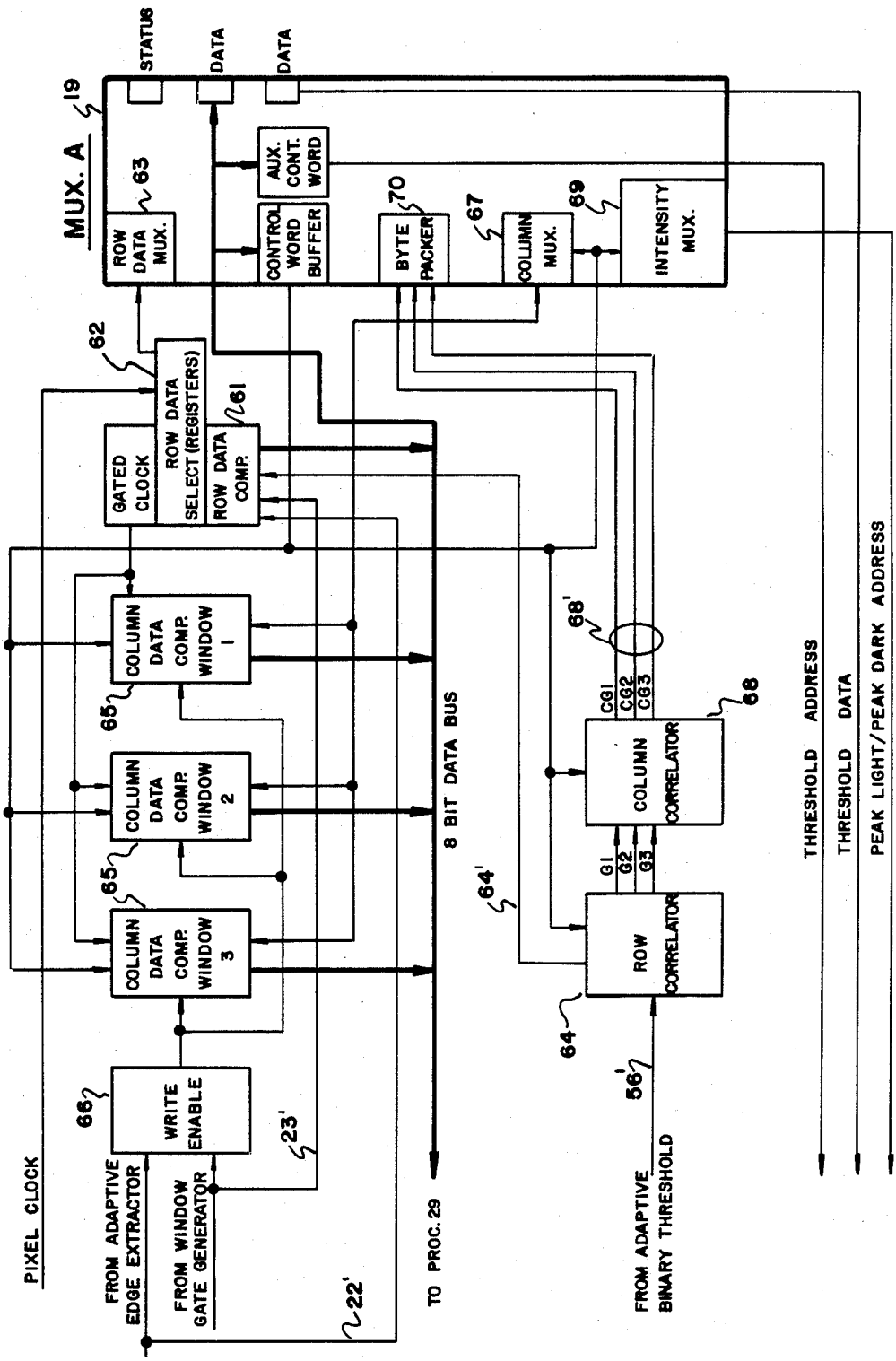

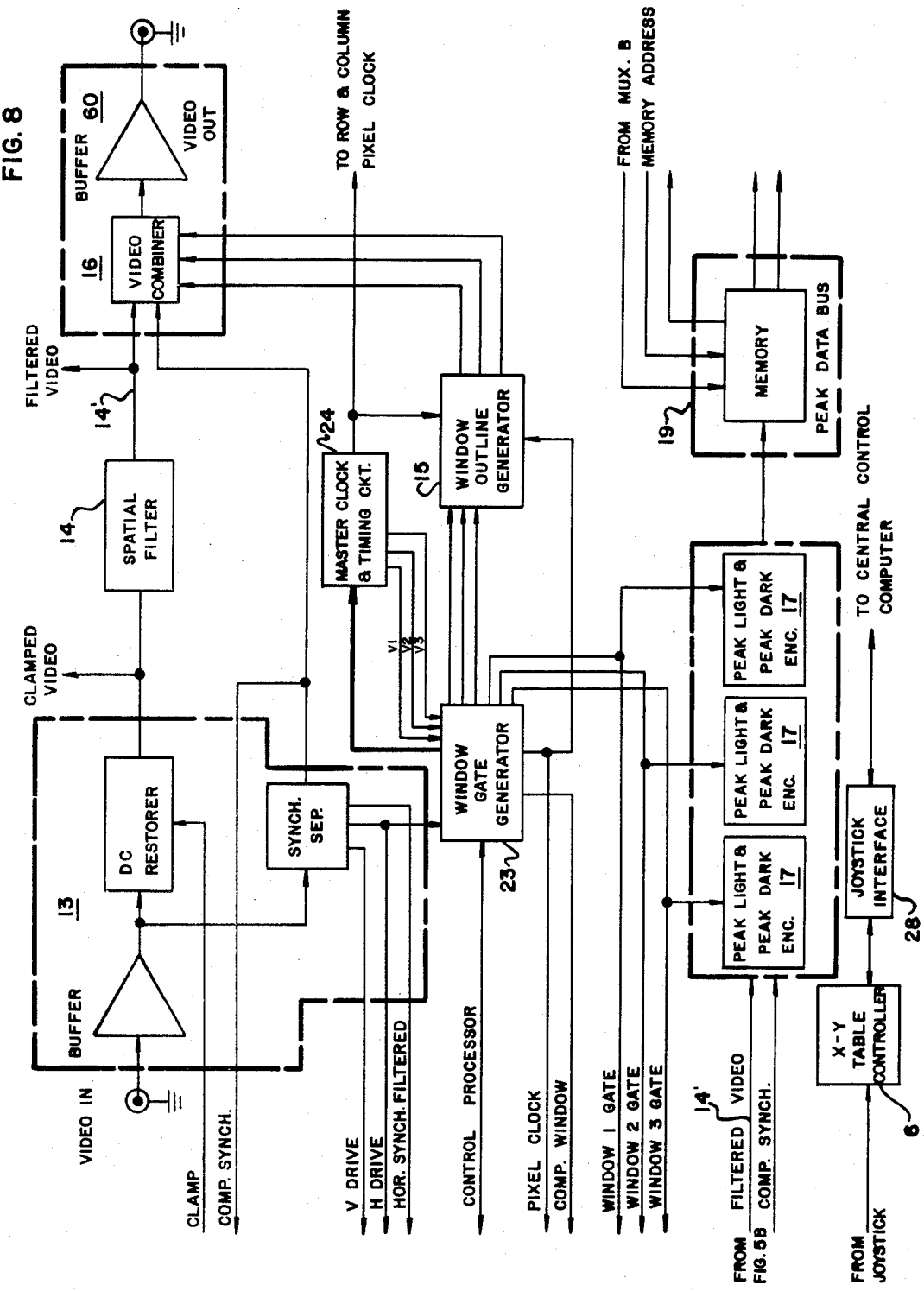

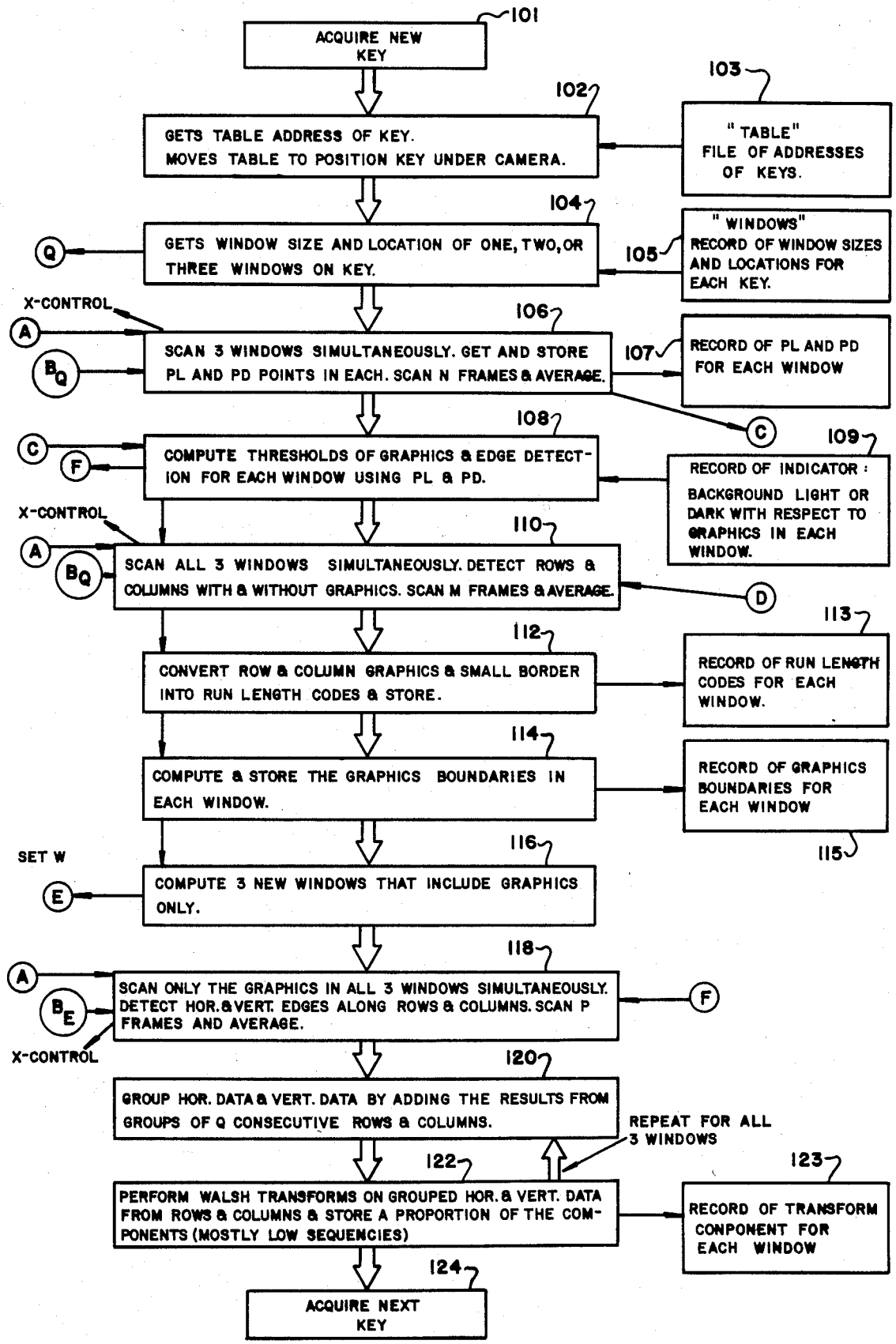

ELECTRO-OPTICAL QUALITY CONTROL INSPECTION OF ELEMENTS ON A PRODUCT

BACKGROUND OF THE INVENTION

This invention relates broadly to automatic quality control inspection of manufactured products, and relates more particularly to an automatic electro-optical system for inspecting graphic indicia on a product to determine whether the product is the same as a previously inspected prototype.

The invention is useful, for example, for the purpose of inspecting assembled computer keyboards to determine whether every one of over ninety key positions contains a key having the correct graphics thereon, having the correct orientation and having the correct colors and contrasts. Quality control inspection of computer keyboards by humans is difficult and inaccurate because of the visual complexity of the keyboards produced, and because of the profusion of keyboards for special-purpose computer applications involving keys with a great variety of graphics thereon. Accordingly, there has been a need for a vision system capable of performing the inspection of keyboards without making errors such as the fatigue-induced errors made by human inspectors. However, previously known automatic inspection systems have not been successful in inspecting products such as keyboards because the graphics to be recognized on each key may occupy a very small proportion of the surface of the key, and the many keys are somewhat spaced apart in a keyboard area which is too large to be scanned by a video camera. That is, it has not been practical to scan the large keyboard area with a sufficiently great resolution to locate and recognize very small distinguishing graphic elements on individual keys, since the essential graphic information occupies a very small proportion of the keyboard area and occupies uncertain locations in the keyboard area.

A paper entitled "Automatic Optical Inspection of Keyboards" by Joseph Wilder appeared in the Record of the Workshop on Industrial Applications of Machine Vision, May, 1982, and is incorporated herein by reference.

SUMMARY OF THE INVENTION

An exemplary inspection system constructed according to the teaching of the invention includes a movable x-y table for supporting a keyboard under a video camera having a field of view sufficient to include one key at a time of the keyboard. In a training phase, the keys of a master prototype keyboard are moved in succession into the field of view of the camera. Window gate means are provided to limit the video information obtained from each key to the graphic information contained within a plurality of operator-set electronic windows unique to the individual key. The video signals from all the windows of all the keys are translated into representative digital signals and stored. In a following production phase, the keys of a keyboard to be inspected are moved in the same succession into the field of view of the camera, and video signals are obtained from all the pre-set windows of all the keys and translated into representative digital signals. The digital signals are compared with stored signals obtained from the prototype keyboard to determine whether the inspected keyboard is the same as the prototype keyboard.

THE DRAWING

Figure 4A:
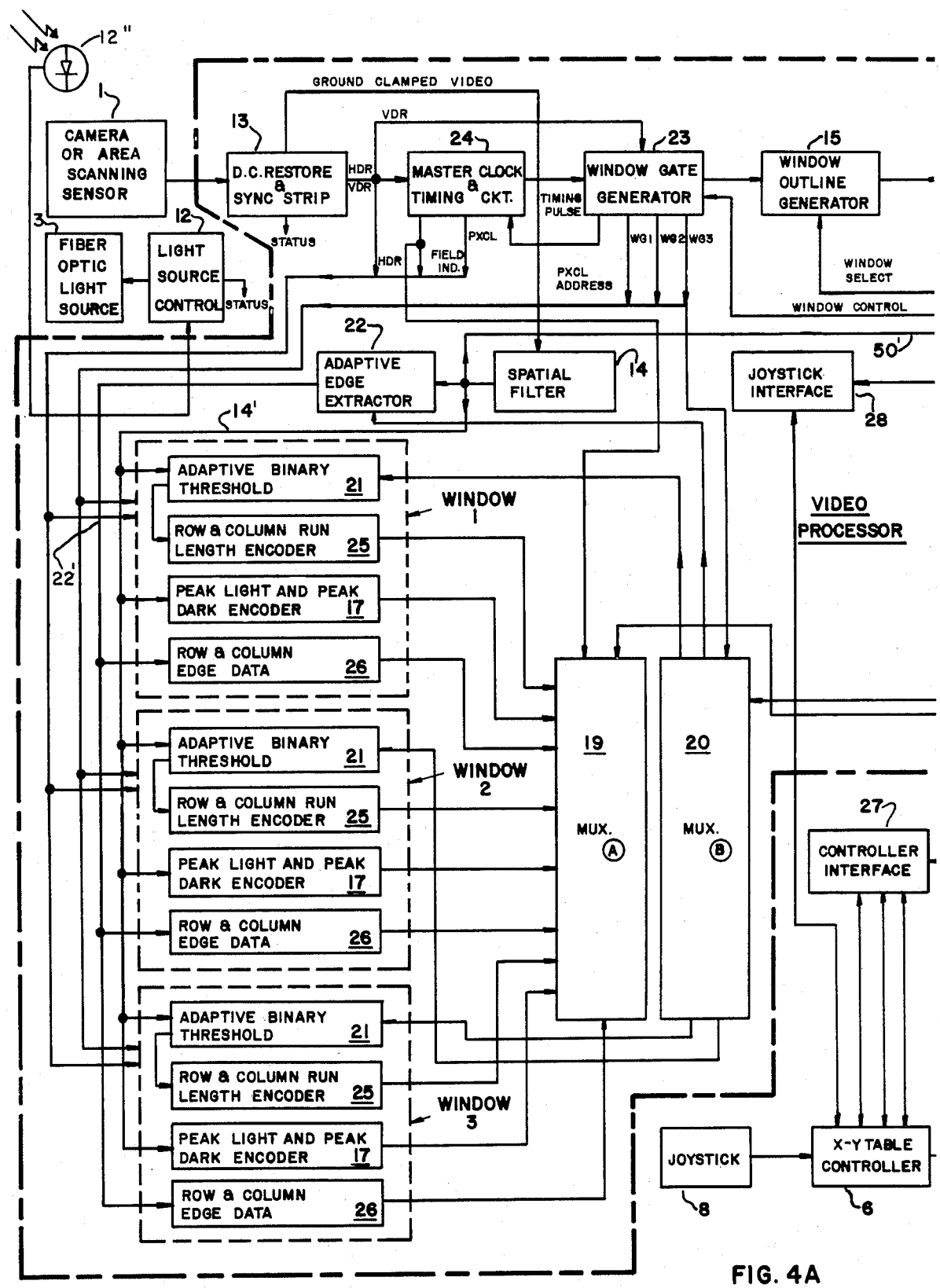
Figure 4B:
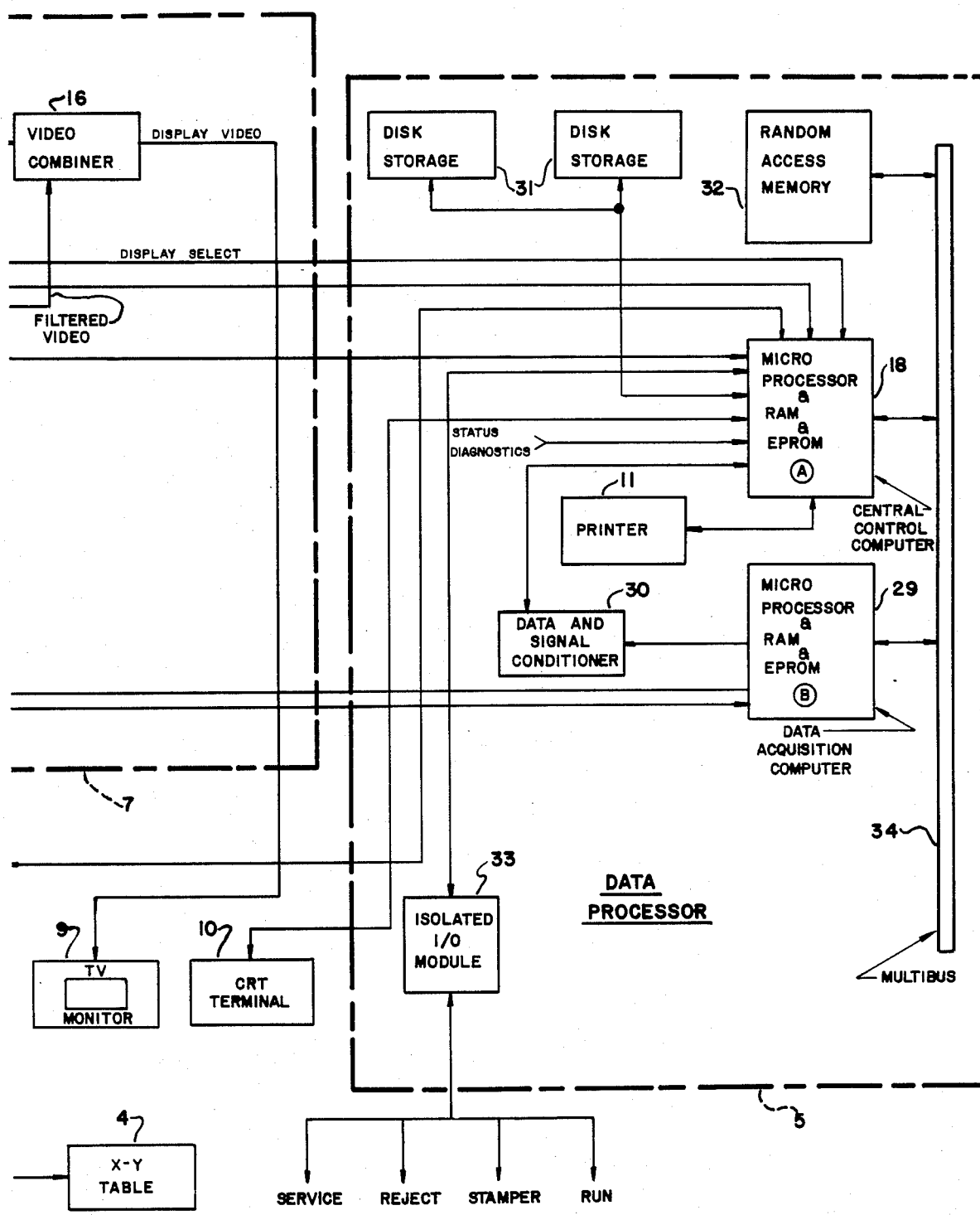
Figure 5:
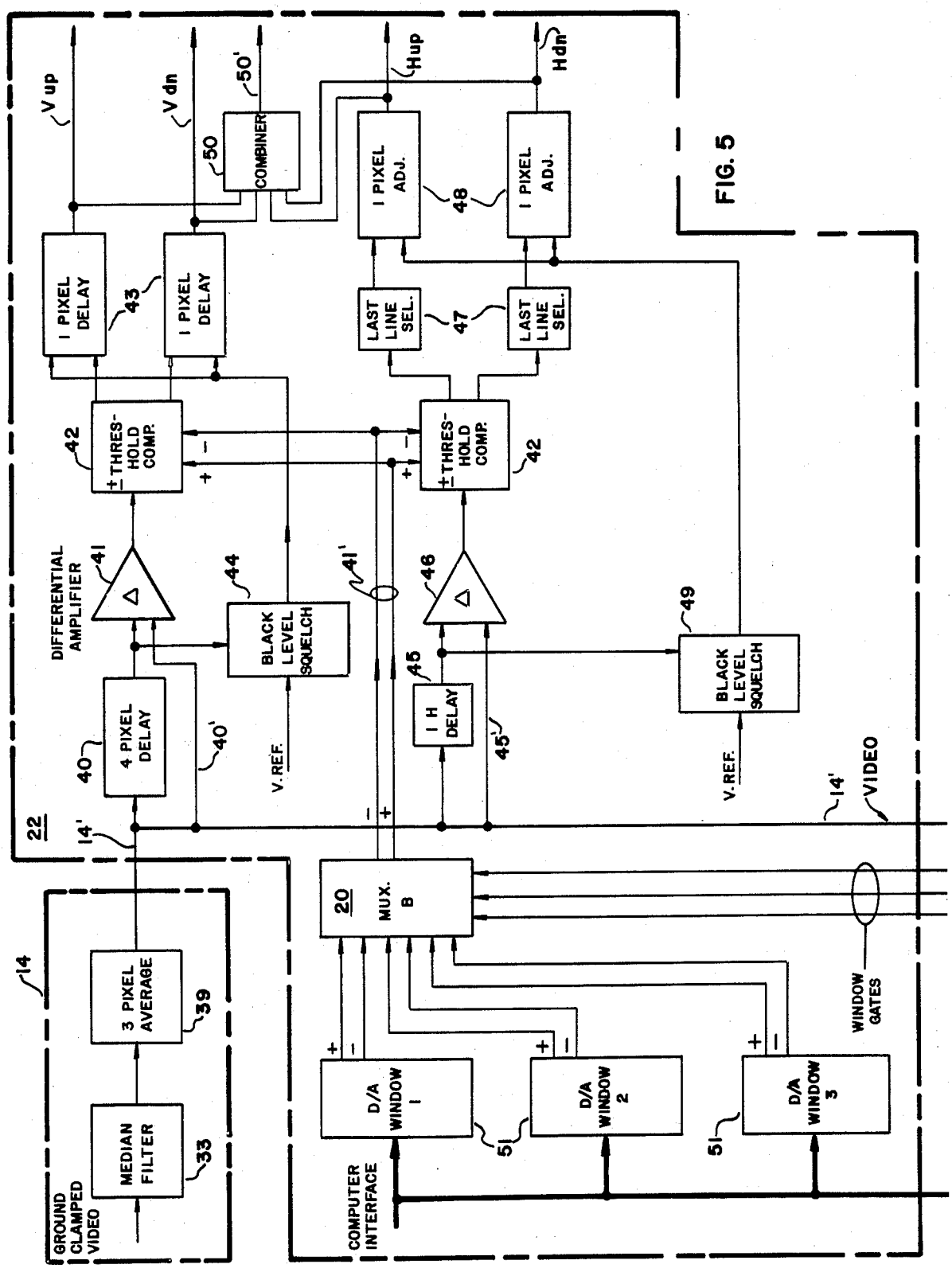
Figure 6:
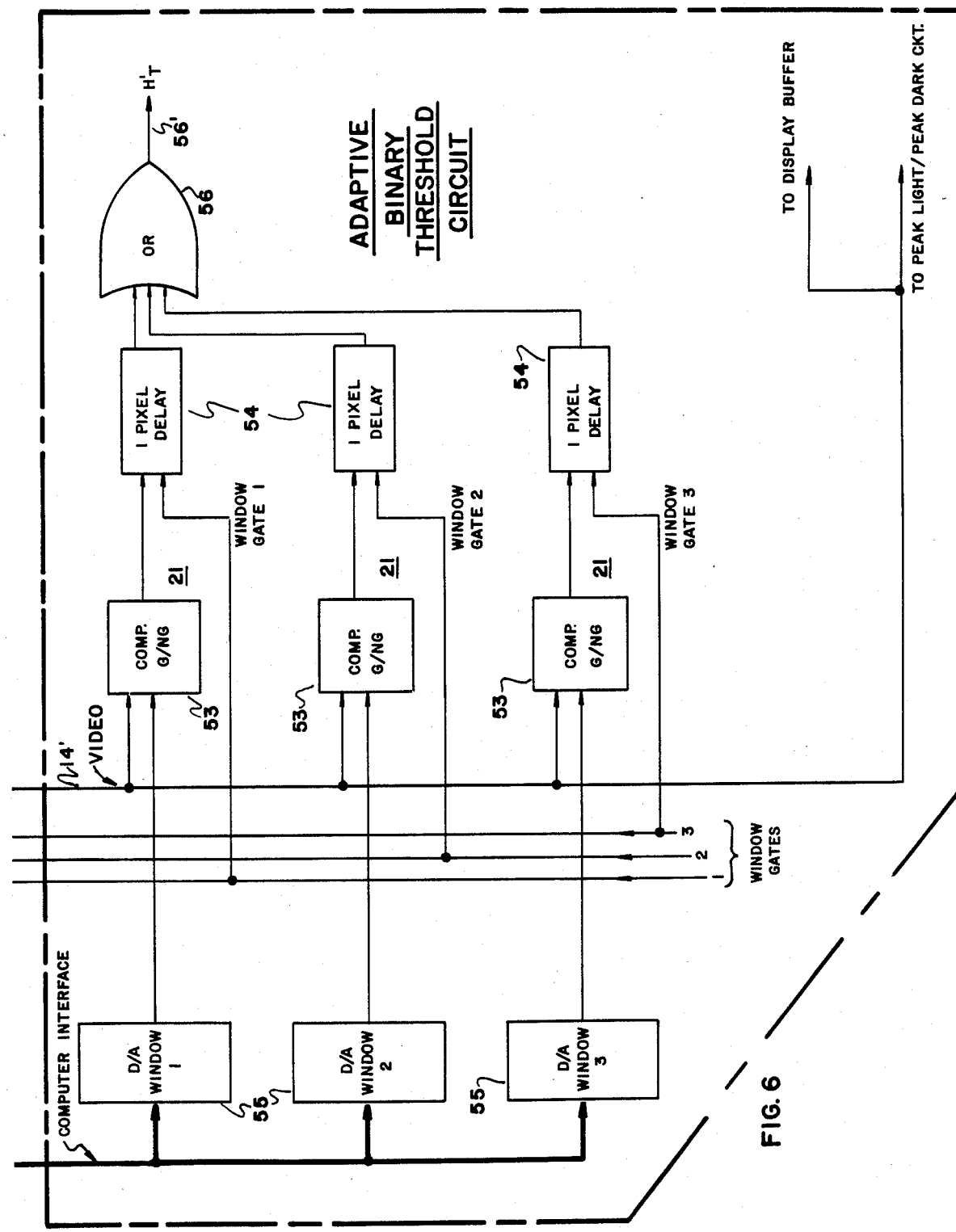
Figure 10A:
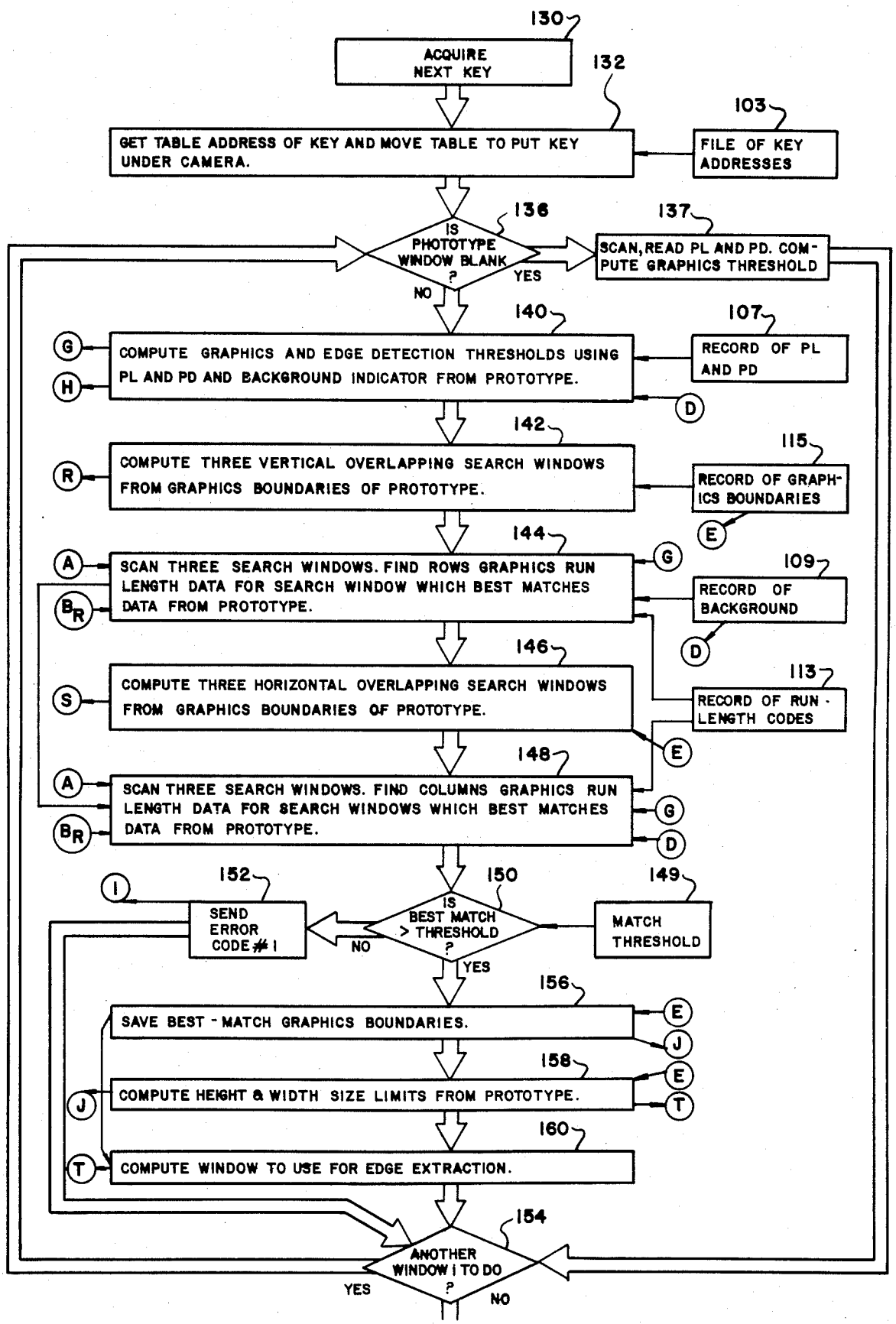
Figure 10B:
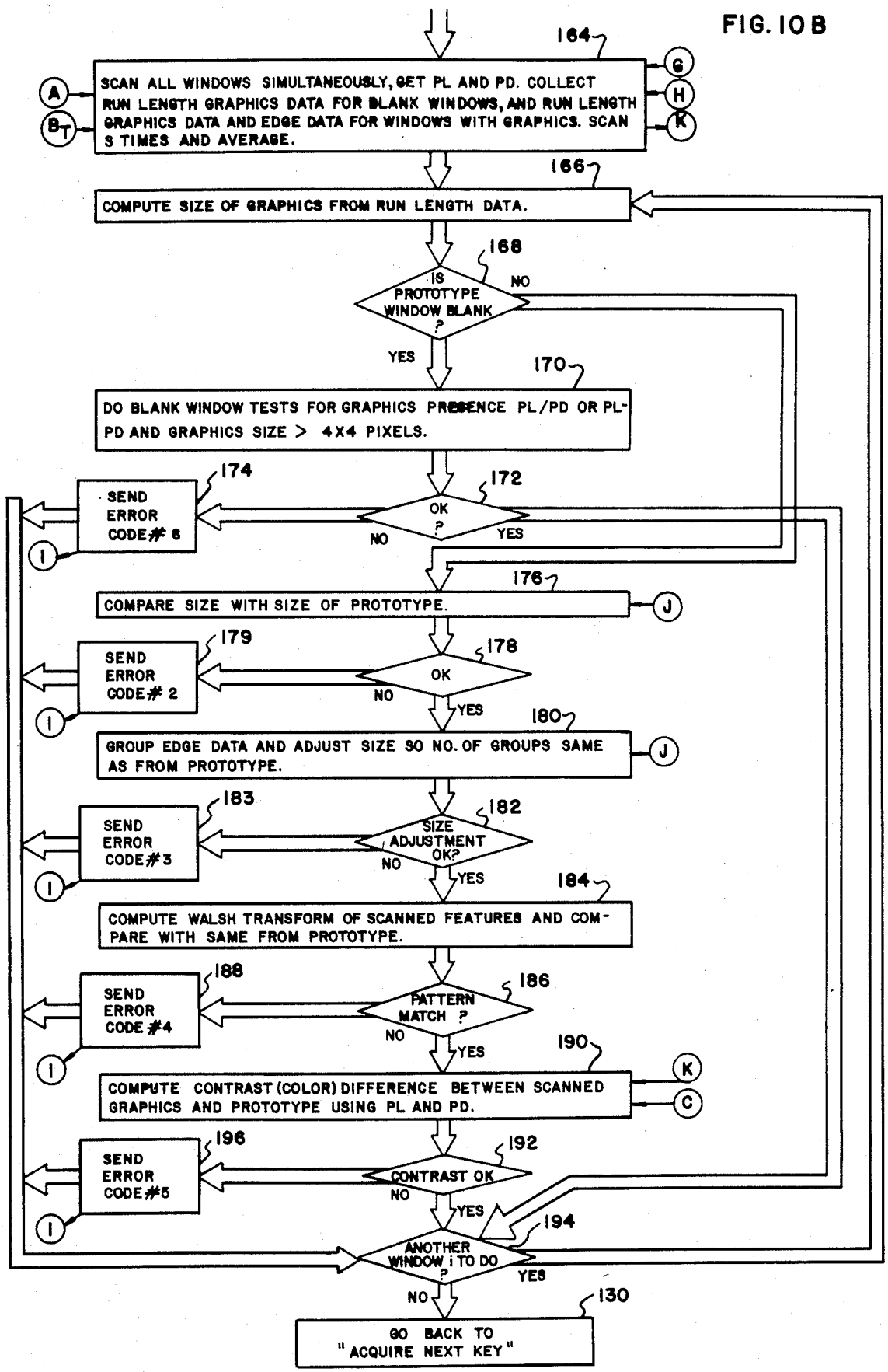
Figure 11:
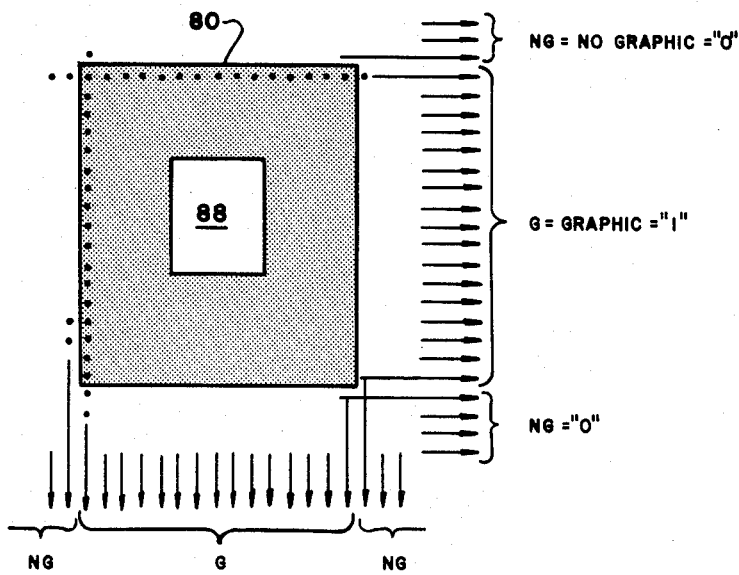
Figure 12:
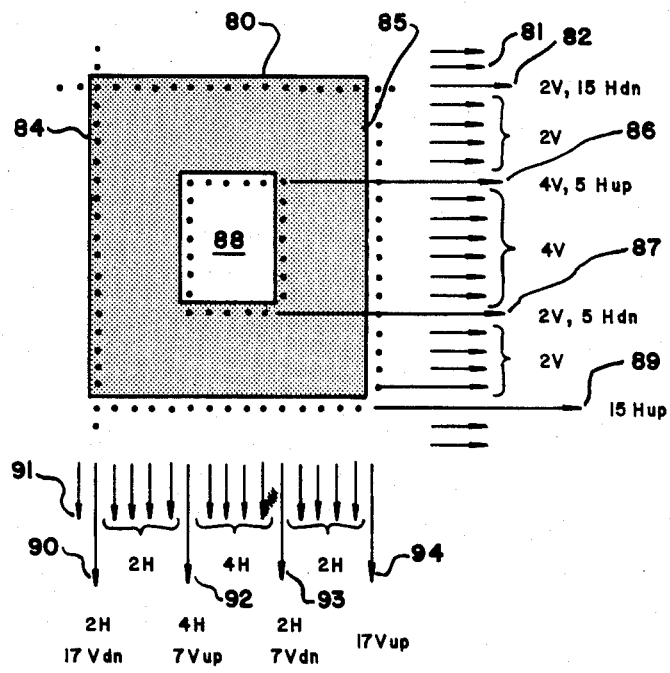

FIGS. 4A and 4B taken together constitute a block diagram of the electronics in the quality control inspection apparatus;

FIG. 5 is a detailed block diagram of the adaptive edge extractor included in the system of FIG. 4A;

FIG. 6 is a detailed block diagram of the adaptive threshold circuit included in FIG. 4A;

FIG. 7 is a detailed block diagram of the row and column edge data circuit and the row and column run length encoder included in FIG. 4A;

FIG. 8 is a detailed block diagram of the peak-light, peak-dark encoder, and other circuits, included in FIG. 4A;

FIG. 9 is a flowchart describing the operation of the system during an automatic training phase;

FIGS. 10A and 10B taken together show a flowchart describing the operation of the system during the operational inspection phase;

FIG. 11 is a diagram illustrating the "graphic" pattern-presence signals obtained by scanning a graphic pattern for the purpose of determining the size and location of the pattern on the keyboard key, and the size and location of a suitable electronic "window" around the pattern; and FIG. 12 is a diagram illustrating the vertical and horizontal "edge" signals obtained by scanning a graphic pattern on a production key for the purpose of computing a pattern "feature" code signal for comparison with a pattern feature code signal obtained by scanning a corresponding prototype key.

DETAILED DESCRIPTION

Figure 1:
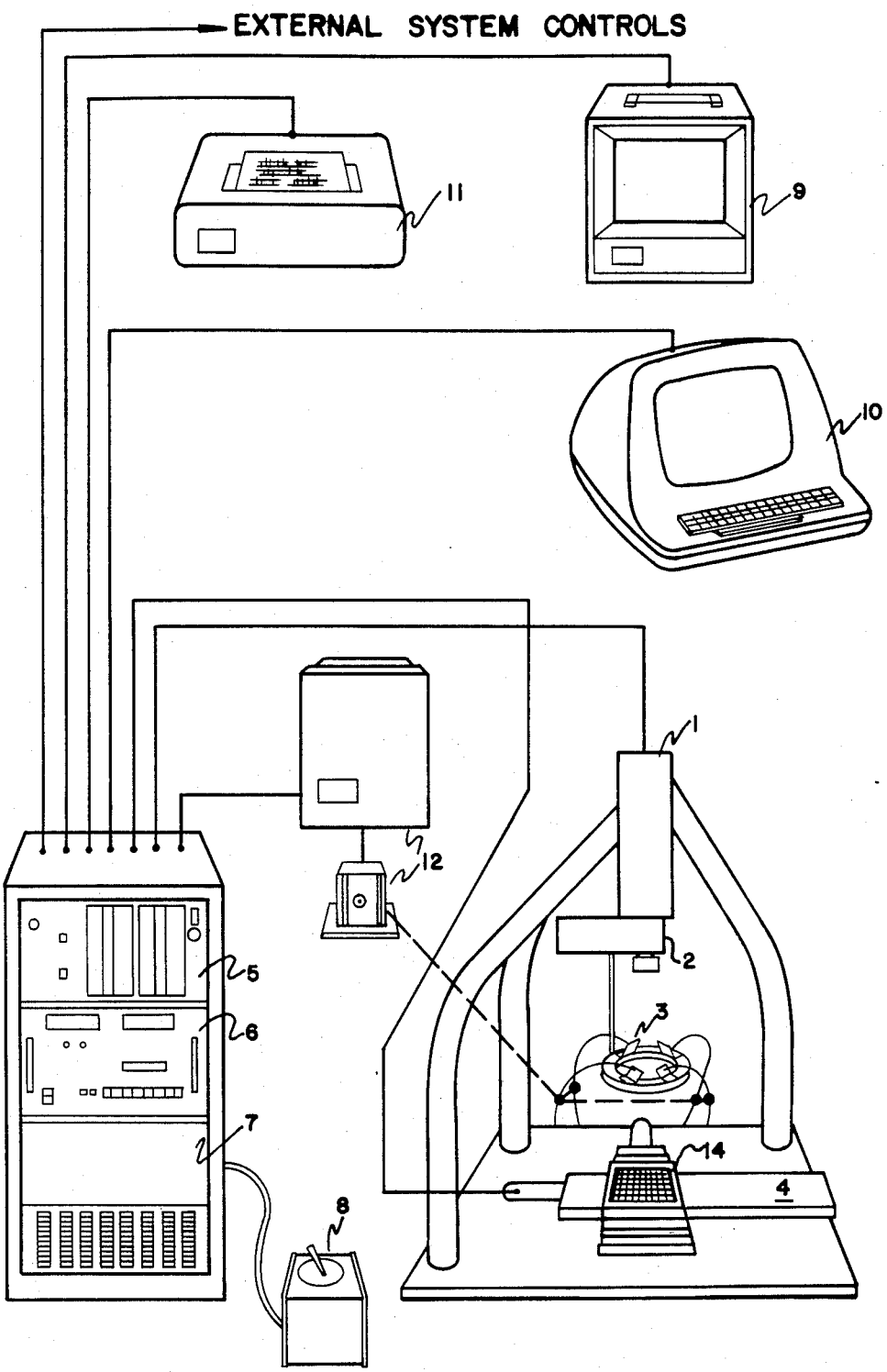
FIG. 1 is a pictorial view of an electro-optical apparatus for quality control inspection of graphics on a product such as a computer keyboard.

Referring now in greater detail to FIG. 1, there is shown a video camera or area scanning sensor 1 having split-image optics 2 positioned in operative relationship with a fiber optic illuminator 3 and a movable x-y table 4. The video camera 1 is connected with a microprocessor 5 having floppy disk memory drives, a controller 6 for the x-y table 4, and preprocessing and data acquisition electronics 7. A joystick 8 is provided for manually controlling the x-y table 4 and for setting electronic "windows" in the frame seen by the camera 1 as displayed on a TV monitor 9. Control of the system is accomplished through a cathode ray tube (CRT) terminal 10, and system output is provided by a printer 11. A fiber optics light source 12 illuminates a keyboard 14 under inspection through a fiber optics system 3.

Figure 2:
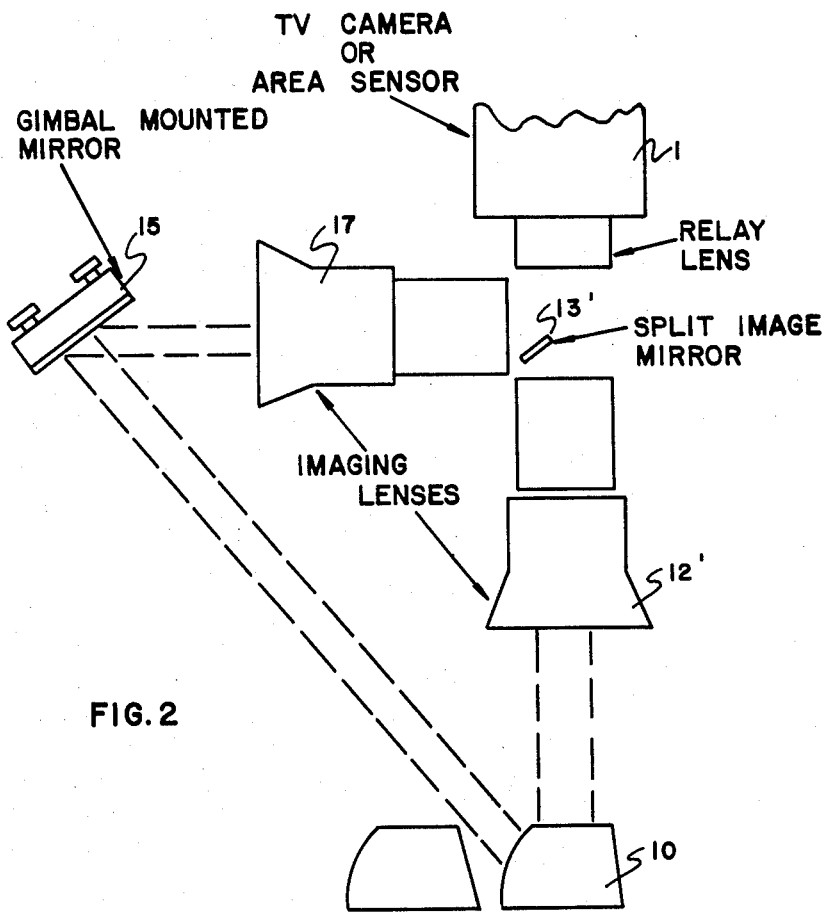
FIG. 2 is a diagram illustrating an optical arrangement by which a video camera can view graphics on both the top surface and a sloping front surface of a key.

FIG. 2 shows the split image optics 2 of FIG. 1 in greater detail to illustrate how a graphic pattern on both the top surface of a key 10 and on the sloping front surface of the key are imaged. The camera 1 sees the top surface of the key through imaging lens 12', and sees the sloping front surface of the key through a path including a split-image mirror 13', an imaging lens 17, and a gimbal-mounted mirror 15. The illustrated construction permits the camera to see the graphic pattern on the sloping front surface of a key without a foreshortening of the graphics which would greatly impair the ability of the system to reliably recognize the graphic patterns.

Figure 3:
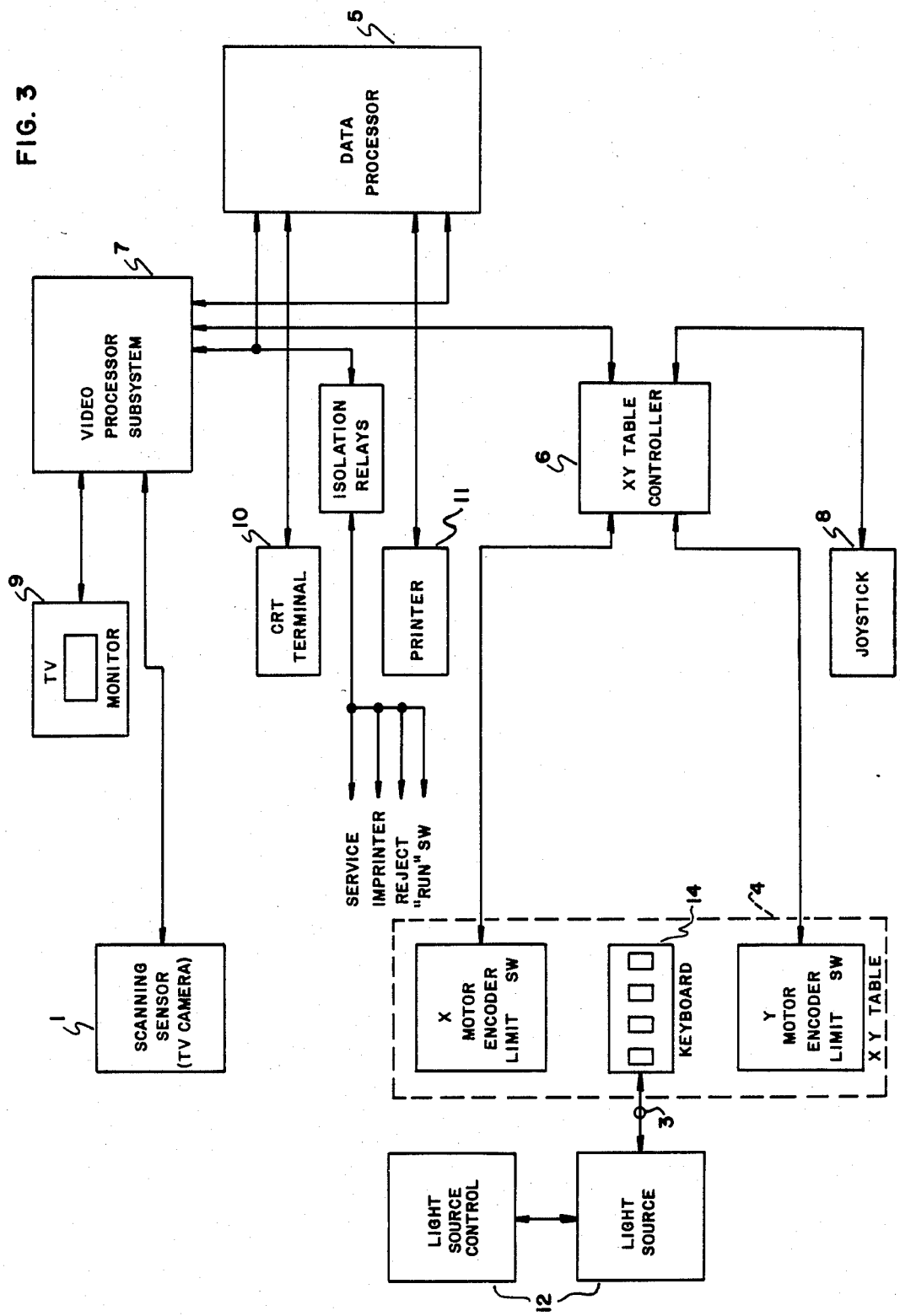
FIG. 3 is a block diagram of the entire inspection apparatus.

The system components shown in a pictorial manner in FIG. 1 are also shown in block diagram form in FIG. 3, with the same numerals applied to the corresponding components in both figures.

Reference is now made to FIGS. 4A and 4B where the system shown in FIGS. 1 and 3 is shown in greater detail. A keyboard (not shown) is illuminated at a constant level by a fiber optic light source 3 and a light source and control 12 responsive to a photoelectric cell 12". A "status" output of the control 12 sounds an alarm in the event of failing of the illumination. The video camera 1 scans one key of a keyboard being inspected and supplies a video signal through a D.C. restore and sync strip circuit 13 and a spatial filter 14 to a filtered video bus 14'. These components are also shown in somewhat more detail at the top of FIG. 8. The spatial filter 14 is shown in FIG. 5 to include a median filter 38 which replaces a pixel with the median of two previous pixels, the present pixel and two subsequent pixels, and a three pixel averager 39.

As shown in FIGS. 4A and 8, the synchronized pulses stripped from the video in circuit 13 are applied to a window gate generator 23 and to a master clock and timing circuit 24. The window gate generator 23 produces signals defining a plurality of electronic windows (three in the present example) in the frame scanned by the video camera. The three window signals are adjusted in size and location to closely frame or surround the essential graphic patterns on a key. The adjustment of the electronic window signals are made during training by an operator manually controlling the joystick 8 to produce signals acting through the joystick interface 28 and the central control computer 18 (FIG. 4B) to the window gate generator 23. During the run mode, the size and location of the windows are controlled by the central control computer 18.

The sizes and location of the electronic windows produced by the window gate generator are visible to the operator on the TV monitor 9. This is so because the window signals from the gate generator 23 are applied to a window outline generator 15 which acts through video combiner 16 to place window outlines on the screen of the TV monitor 9. The video signal on line 14' is also applied through the video combiner 16, so that the TV monitor 9 displays the window outlines superimposed on the entire frame scanned by the video camera. The electronic windows determined by the operator for each key during the training procedure with a prototype keyboard, are stored in disk storage 31 of the central control computer 18. During a subsequent keyboard inspection procedure to be described, the stored windows are called from memory and used to concentrate attention of the inspection apparatus on the essential graphic pattern information within the boundaries of the predetermined windows.

The adaptive edge extractor 22 in FIG. 4A is shown in greater detail in FIG. 5 to include a differential amplifier 41 having a delayed video signal input from a four-pixel delay unit 40, and having an undelayed video signal on line 40'. The output of differential amplifier 41 is thus a four-pixel video positive (or negative) pulse whenever the video signal has a vertical up (or down) transition due to the passage of a scan line of the video camera 1 through a vertical edge from white to black (or from black to white) of a graphic pattern on a key. The output signal from the differential amplifier is compared in threshold comparator 42 with threshold signals received over lines 41' via B multiplexer 20 and digital-to-analog converters 51 from the data acquisition computer 29 in FIG. 4B. The outputs of threshold comparator 42 are applied through pulse standardizing circuits 43 to a vertical edge up signal output line, Vup, and to a vertical edge down signal output line, Vdn. Accordingly, a signal on the Vup line represent dark-to-light transition in a vertical edge of a graphic pattern, and a signal on the Vdn line represents a light-to-dark transition in a vertical edge of a graphic pattern.

The generation of signals representing horizontal edges of a scanned graphic pattern is accomplished by a differential amplifier 46 receptive to an undelayed video signal on line 45' and a delayed video signal from a one-horizontal-line-delay unit 45. The differential amplifier 46 provides an output of one polarity when only the second of two horizontal line scans encounter a graphic pattern, and provides an output of the other polarity when only the first of two horizontal line scans encounter a graphic pattern. The signals from differential amplifier 46 are applied to a threshold comparator 42 which receives threshold signals via B multiplexor 20 and digital-to-analog converters 51 from the data acquisition computer 29 in FIG. 4B.

The two outputs of the threshold comparator 42 are applied to last line selector circuits 47 which insure that when a horizontal edge of a graphic pattern is encountered, solely one horizontal edge signal is generated. If the last line selector circuits 47 are omitted, and the horizontal edge of a graphic is tilted relative to the scan lines, false horizontal edge signals may be produced during overlapping portions of two or more horizontal scan lines. Then the horizontal edge signal will incorrectly indicate the presence of more than one horizontal graphic edge. The last line selector circuit 47 passes only the last one of successive horizontal edge signals to correctly represent the single horizontal edge of the graphic pattern.

The outputs of the last line selectors 47 are passed through signal standardizing circuits 48 to a horizontal up line, Hup, for signals representing a transition from one scan line to a higher amplitude scan line, and to a horizontal down line, Hdn, for signals representing a transition from one scan line to a lower amplitude scan line.

The signals on lines Vup, Vdn, Hup and Hdn are connected through a combiner 50 in FIG. 5 and over bus 50' to the video combiner 16 FIG. 4B. The output of combiner 16 is a video display signal applied to TV monitor 9. The signals on lines Vup, Vdn, Hup and Hdn are also applied over bus 22' to three row and column edge data circuits 26 in FIG. 4A which will be described in detail in connection with FIG. 7. There is a separate circuit 26 for each of the three windows determined by window gate generator 23.

FIG. 6 shows the details of the three adaptive binary threshold circuits 21 included in FIG. 4A. The three circuits 21 are associated with three respective electronic windows established by window gate generator 23. Each circuit 21 includes an analog output of a digital-to-analog converter 55 for a respective one of the three windows. Each converter 55 converts a digital threshold signal received from data acquisition computer 29 to a corresponding analog threshold signal for comparison with the video signal in corresponding comparator 53 and produces an output which is gated in the circuit 54 during the corresponding window gate from generator 23 to an "or" gate 56. The signals from the three circuits 21 during the three windows are combined in "or" gate 56 for application to row and column correlators or run-length detectors, 64 and 68 of FIG. 7. The output signal is high to represent a graphic pattern and is low to represent the absence of a graphic pattern signal which may be referred to as graphics/no graphics signal, G/NG, indicating whether the pattern is present or absent.

The signals from edge extractor 22 on lines Vup, Vdn, Hup and Hdn in FIG. 5 are applied in FIG. 7 over bus 22' to a row data compactor 61 which counts the number of Hup signals, the number of Hdn signals, and the number of Vup and Vdn signals in each of the three windows during appropriate ones of the 240 horizontal scan lines of the TV field. In addition, the graphics/no graphics signal, G/NG, on line 56' from circuits 21 in FIG. 6 is applied through row correlator 64 and line 64' to the row data compactor 61, which records whether there was a graphic pattern in each of the three windows during the horizontal scan lines. All the scan signals collected in the row data compactor 61 are transferred at the end of a frame scan line to row data select registers 62 from which the data signals are transferred through a row data multiplexer 63 to the data acquisition computer 29 at the same time that the new row data signals for the next scan line are being received by the row data compactor.

To summarize, the row data acquired and supplied to the computer by the end of a scanned frame includes:
  total Hup per window per line,
  total Hdn per window per line,
  total Vup and Vdn per window per line, and
  G/NG per window per line.

The foregoing row digital signals together with a window active bit for each window, constitute row data describing "features" of the graphics in the three windows, for use in comparing corresponding row data obtained from scanning the corresponding key on a prototype keyboard.

Having described the acquisition of row data, the acquisition of column data will now be described with references to FIG. 7. The signals on lines Vup, Vdn, Hup and Hdn from the adaptive edge extractor of FIG. 5 are applied through a write enable circuit 66, under control of window gate signals from generator 23, to three column data compactors 65, one for each of the three windows. Each column data compactor includes three memories, one for collecting the Vup signals for each row scan line, a second for collecting Vdn signals for each row, and a third for collecting a total of Hup and Hdn signals for each row. After the signals for all rows have been stored, the numbers of signals in each of the 256 columns into which the video frame is divided are totaled and read out under control of the column data multiplexer 67 via the 8-bit data bus to the data acquisition computer 29.

Concurrently with the foregoing, the graphics/no graphics signal G/NG supplied to row correlator 64 is forwarded to three memories in the column correlator 68, one memory for each of the three windows. After the graphics signals for all rows have been stored, the signals are read out by columns over lines 68' to a byte packer 70 in the A multiplexer 19, and then forwarded to the data acquisition computer 29.

To summarize, the column data acquired by the computer includes:
  Total Vup per window, per column,
  Total Vdn per window, per column,
  Total Hup and Hdn per window, per column, and
  G/NG per window, per column.

The previously described row data, and the now to be described peak-light and peak-dark data, are acquired from a key being inspected for comparison with corresponding data obtained from a prototype key. Three peak-light and peak-dark circuits 17 for three respective windows are shown in FIG. 4A and in FIG. 8. Each circuit 17 includes a sample-and-hold and update circuit for peak-light video, and a sample-and-hold and update circuit for peak-dark video. Each circuit 17 responds to the video signal on bus 14', and operates under control of a composite synch signal from synch strip circuit 13, and its respective window gate signal from generator 23, to produce for each of the three windows, a peak-light signal $P_L$ and a peak-dark signal $P_D$. These signals are stored in a memory in the A multiplexer 19 and thereby made available to the data acquisition computer 29.

The described hardware is employed in acquiring information about a production keyboard key for use in comparison with information previously obtained about a prototype key. The hardware is used to inspect and verify the graphics on each of the keys, one at a time, in sequence, until all of the keys on the keyboard have been inspected and verified.

VIDEO SIGNAL PROCESSING

Before describing the operation of the inspection apparatus, reference is made to FIGS. 11 and 12 for descriptions of video signals obtained during the scanning of an exemplary graphic pattern 80 in one electronic window of one key of a keyboard. FIG. 11 illustrates the "graphics" signals which reveal the rectangular boundaries of the graphic pattern 80 and which are used to compute a "window" closely surrounding the pattern. Only that part of the video signal obtained when scanning through a window is used for graphic pattern matching purposes. FIG. 12 illustrates the graphic pattern edge detection signals obtained from within a window determined from the signals shown in FIG. 11. The graphic pattern boundary signals of FIG. 11 are derived from the video signal by the adaptive binary threshold circuit 21 of FIGS. 4A and 6. The graphic pattern edge signals of FIG. 12 are derived from the video signal by the adaptive edge extractor 22 of FIGS. 4A and 5.

In FIG. 11, the top row of dots shown illustrates the size or spacing of pixels (picture elements) along the first row scan line going through the graphic pattern 80. The left-most column of dots shown illustrates the size or spacing of pixels along the first column going through the graphic pattern 80. A row graphic pattern presence signal, G is produced, in row correlator 64 of FIG. 7, for every horizontal scan line which encounters the graphic somewhere along the scan line. A column graphic presence signal CG is produced in column correlator 68 in FIG. 7 for every column of pixels in which a graphic pattern is encountered somewhere along the column. It can be seen that the row graphic and column graphic signals define the rectangular boundaries of the graphic pattern 80. The graphic signals G are produced by the hardware, as has been described, only when the graphic pattern is at least n pixels in width and at least m pixels in height, where n and m are of the order of the width of and height of the smallest valid graphics of interest. This prevents small noise pulses in the video signal from being interpreted as part of a graphic pattern.

In FIG. 12, edge data signals shown are derived in the edge extractor 22 of FIGS. 4A and 5 from the same video signal as the graphics presence signals of FIG. 11. The first horizontal row scan 82 which passes through the pattern 80 produces in row compactor 61 of FIG. 7 the signal 2V representing the vertical down edge (light-to-dark going left to right) at 84 plus the vertical up edge (dark-to-light going left to right) at 85. The vertical down and up edges are counted together because a down edge is almost always followed by an up edge, and thus there is no need for pattern matching purposes to separately count the up and down edges. There is very little information added by counting them separately. The row scan 82 also produces the signal 15Hdn representing the horizontal edge between row 82 and the previous row 81. The signal 15Hdn indicates that a top horizontal down edge (light-to-dark going top to bottom) fifteen pixels long has been encountered. The signals during scan lines 81 and 82 are compared with each other in differential amplifier 46 in FIG. 5 by delaying in delay unit 45 the scan signal 81 the amount of one horizontal scan line of video camera 1, so that the signals of the two scan lines coincide in time. The count of fifteen is obtained by counting pulses from the pixel clock 24, FIG. 4A, applied to the row data registers 62 during the time that the pattern is encountered.

The four scan lines following scan line 82 result in a signal 2V for each line or row. The next row scan line 86 and each of the following six scan lines each result in a signal 4V as the result of a vertical down signal at the edge 84, a vertical up signal at the vertical edge of the hole 88, a vertical down signal at the right edge of hole 88 plus a vertical up signal at the edge 85, making a total of four vertical edge signals. The scan line 86 also produces a signal 5Hup (dark-to-light going top to bottom) which results from the five light pixels in hole 88 of line 86 following no light pixels in the previous scan line. Scan line 87 and the following four scan lines each produce a 2V signal and scan line 87 also produces a 5Hdn signal because the line encounters five dark pixels after five light pixels in the previous scan line going through the hole 88. Finally, the scan line 89 produces a 15Hup signal because the line encounters fifteen light pixels after the previous scan line encountered fifteen dark pixels.

The described edge signals are produced only from the portions of the rows and columns within windows that include only the graphics of interest, i.e., where n or more consecutive pixels occur. This prevents the appearance of false signals due to noise rather than a graphic pattern.

The described row vertical and horizontal edge signals shown in FIG. 12 are applied through the row data compactor 61 in FIG. 7 to the row data registers 62. At the same time, the row vertical and horizontal edge signals are stored in order in the memory in one of the column data compactors 65 associated with the window in which the graphic pattern 80 appears. Then, the edge information in each column is drawn from the memory.

In FIG. 12, the column signals in the first column 90 add up to 2H for the top and bottom horizontal edges of the pattern 80. so distinction is made between horizontal down edges and horizontal up edges, because one almost always follows the other,Px the type of edge does not have value for pattern matching purposes. The first column 90 also provides the signal 17Vdn to represent the edge 84, because there are seventeen dark pixels in column 90 following seventeen light pixels in column 91, or seventeen vertical down edge signals in the column.

The four columns between columns 90 and 92 each produce the signal sum 2H representing the top and bottom horizontal edge of the pattern 80. The four columns between columns 92 and 93 each produce the signal sum 4H representing the top and bottom edge of the pattern 80 and the top and bottom edges of the hole 88 in the pattern. The column 92 also produces a sum signal 7Vup representing the seven vertical up edges in the seven horizontal row scan lines going through the hole 88 in the pattern. And, the column 93 produces the sum signal 7Vdn representing the seven vertical down edge signals produced at the right side of the hole 88. Finally, the column 94 produces a sum signal 17Vup representing the seventeen vertical up signals from the seventeen horizontal row scan lines going through the right edge 85 of the pattern 80.

The graphics/no graphics signals illustrated in FIG. 11 are coded in run-length form for use in computing the size and location of a window to be used in collecting the edge signals illustrated in FIG. 12. A no graphic signal for a horizontal scan line may be represented by a binary "0" and a graphics present signal may be represented by a "1". In the run-length code, the first three row NG signals are represented by a "3", the next seventeen G signals are represented by a "17", and the last four NG signals are represented by a "4". This greatly reduces the number of bits needed to describe the rectangular boundaries of the graphic pattern 80. For example, the binary representation of "17" is 10001, which is only five bits compared with the seventeen "1" bits prior to run-length coding. The graphic and no graphic signals for the columns are similarly translated to the run-length code form. The run-length-coded information describing the location and boundaries of the graphic pattern are used to compute suitable electronic windows surrounding the pattern for the selection from the video signal of the edge data illustrated in FIG. 12.

The pattern edge signals illustrated in FIG. 12 fall in two categories of row signals, and in two categories of column signals. In the rows, one category consists of the sequence of V's representing vertical up and down edges. The second category consists of the sequence of Hdn and Hup. Assigning $-1$ to Hdn points and $+1$ to Hup points, in the FIG. 12 example, this category includes $+15$(Hdn), $-5$(Hup), $+5$(Hdn) and $-15$(Hup). In the columns, one category includes the sequence of H's as follows: 2H, 2H, 2H, 2H, 2H; 4H, 4H, 4H, 4H, 4H; 2H, 2H, 2H, 2H, 2H, and the other category includes assigning $-1$ to Vdn points and $+1$ to Vup points, $+17$(Vdn), $-7$(Vup), $+7$(Vdn), and $+17$(Vup).

The quantity of digital signals necessary to describe the edge signals in the described four categories is reduced by grouping or averaging the signals in four successive rows, and by grouping or averaging the signals in four successive columns. That is, the numbers of signals in each of the four categories is reduced to one-fourth of what it was. Then, a Walsh transform is performed on the row-grouped and column-grouped signals in each of the four categories. The Walsh transform is used because it concentrates the bulk of the information contained in the grouped signals into the low-sequency ones of the components produced by the transform process. Therefore, a further data reduction can be accomplished by employing on a fraction, say two-thirds to three-fourths, of low-sequency components of the four categories of edge-representing signals to create a feature set which describes the graphic pattern scanned without leaving out any essential details. The low-sequency components of the four categories of edge-representing signals obtained during the scanning of a window of a key of a production keyboard are compared with the corresponding low-sequency components of the corresponding four categories of edge-representing signals obtained during the scanning of a window of a key of a prototype keyboard to determine a statistically probable identity therewith.

The pattern under test is compared with a prototype pattern by computing a distance between the patterns based on Euclidean metric computed from the features of the two patterns. The prototype pattern can be obtained from a single training keyboard or, for improved accuracy of inspection, from the average of the features of a plurality of correct training keyboards. The acceptance threshold for deviation of the scanned production pattern from the prototype is computed, in one embodiment, as a proportion of the magnitude of the prototype vectors. Thus large or complex patterns will allow greater acceptance distances than small simple patterns for the same proportion. In another embodiment, the acceptance threshold is computed as a multiple, e.g. 1.5, of the greatest distance of a training sample from the average of all training samples. This rule guarantees that all vaid training samples will be accepted. In either embodiment, the proportion or multiple is selected for each window by the operator during training. There could be three choices, e.g. normal, tight, or loose or the number of gradations between tight and loose can be enhanced to n steps.

When a defective graphic pattern is detected, a signal is transmitted to a label printer, an error message is transmitted to a line printer indicating the location of the defective key, and the quality accounting file for that keyboard is updated.

OPERATION

The apparatus described includes a central control computer 18 which is programmed to control the performance of many basic steps gone through in inspecting a keyboard to determine whether it is the same as a prototype keyboard. However, the basic program must be adjusted or tailored to a particular prototype keyboard. The training procedure will now be described. First, a prototype keyboard is mounted on the x-y movable table 4, and the joystick 8 is manually operated to cause signals to the x-y table controller 6 which steps each key of the prototype keyboard in succession into the field of view of the video camera 1. The exact positions of the keys are always displayed to the operator on the TV monitor 9. The operator concurrently uses the computer terminal 10 to store in computer disk storage 31 the information needed to cause the x-y table to automatically step the keys in succession to the preset positions in the field of view of the camera 1. The training operator also manipulates the joystick 8 to control the window gate generator 33 to adjust the sizes and locations of up to three windows for each key, so that the windows most closely surround the elements of the graphic image on each key, and largely exclude blank areas of each key. The operator also causes the window sizes and positions for each key to be stored in disk storage 31 for automatic re-creation by the window generator when needed during inspection of a product keyboard. In addition, the operator stores whether the graphics in each window of each key are light or dark relative to the background of the key and the degree to which tight or loose tolerances are needed for pattern matching as judged by a scaled indicator.

The foregoing manual training phase is followed by an automatic training phase in which the x-y table moves the keys of the prototype keyboard into positions under the video camera in the sequence and exact registry learned during the manual training phase, and stored in the computer disk memory 31. FIG. 9 is a flowchart describing the steps gone through from the time at 101 when a key is to be positioned in the field of view of the video camera until the time when the next key is to be acquired. At 102 the program refers to the stored table 103 of key addresses and moves the x-y table 4 so that the key to be inspected is in the field of view of the camera 1. At 104 the program refers to the stored record 105 of window sizes and location, and causes the window gate generator 23 to generate the windows determined during the manual training phase to be best for use when examining the particular key.

TABLE I

GLOSSARY OF OPERATIONS & DEFINITIONS, FIGS. 9 and 10

A = Preprocessed Video output from Video Processor.
$B_j$ = Three Window Generator output:
= $B_Q$ when Q is input (training phase).
= $B_E$ when E is input (training phase).
= $B_R$, $B_S$, $B_T$, when R, S, T are input respectively in operating phase.
C = Peaklight ($P_L$) and Peakdark ($P_D$) for windows (training phase).
D = Record of Background indicator - whether background is light or dark with respect to graphics.
E = Window borders of prototype (training phase) graphics.
F = Edge threshold (training phase).
G = Graphics Threshold (operating phase).
H = Edge Threshold (operating phase).
I = Error Code storage for each window.
J = Size limits (computed from top, bottom, left and right of prototype) used for size check in operating phase.
K = Peaklight ($P_L$) and Peakdark ($P_D$) of graphics window in operating phase.
M = Last window number defined in the present key:
i = number of present windows being processed.
Q = User defined window boundaries (training phase).
R = Window boundaries for correlation vertical search windows.
S = Window boundaries for correlation horizontal search windows.
T = Graphics Window boundaries computed in operating phase from correlation data (used to extract edges).
X Control = Control program for video processor used for all I/O video processor.
SETW = Control program to access three windows generator to set predefined windows on key.

At 106, the entire face of the key is scanned by the video camera and the resulting video signal is applied to the three peak-light and peak-dark encoders 17 for the three windows and each encoder determines the peak-light signal $P_L$ and the peak-dark signal $P_D$ during scanning through the particular window. The signals generated during four field scans are averaged and are stored in the record 107 of $P_L$ and $P_D$ for each window.

At 108, graphics detection thresholds and edge detection thresholds are computed for each window using the values of $P_L$ and $P_D$ for the respective windows, and using the information at 109 of whether the graphics are light on dark background or dark on light background. The graphics/background information was stored on the memory disk 31 during the manual training phase previously described.

At 110, the computed graphics detection thresholds for the three windows are supplied to the adaptive binary threshold circuits 21 of FIG. 6 for comparison with the video signal obtained while scanning through the three windows. The signals obtained during four field scans are averaged. The resulting graphics/no graphics signals G/NG are applied from the threshold circuits in FIG. 6 to the row correlator 64 and column correlator 68 in FIG. 7 where the scan line rows in each window having graphics somewhere in the row are noted, and the columns in each window having graphics somewhere in the column are noted. This graphics information, plus signal level information from a small border around the graphics, is converted into run-length code for each window and stored in a record at 113.

At 114, the program uses the available graphics signals information to compute the top, bottom, left and right edges of the graphics in each window and store the computed edges in a record at 115.

At 116, the program uses the above edge data to compute tight windows that include just the graphics in each window.

At 118, the edge detection thresholds for each window which were computed at 108 are employed in the adaptive edge extractor 22 (FIGS. 4 and 5), with the video signal present during solely the computed tight windows, to detect the vertical and horizontal edges of the graphics. The vertical edge signals Vup and Vdn, and the horizontal edge signals Hup and Hdn are applied to the row data compactor 61 in FIG. 7 which counts the number of Hup signals, the number of Hdn signals, and the number of Vup and Vdn signals in each of the three windows. The Vup, Vdn, Hup and Hdn are also applied to the three column data compactors 65 for the three windows from which are obtained the column data: total Vup, total Vdn, and total Hup and Hdn; all per window, per column. The signals are all averages obtained over eight scanned frames.

At 120, the horizontal data and the vertical data are grouped by adding together the signals from four (Q) consecutive rows and columns.

At 122, Walsh transforms are performed on the grouped horizontal and vertical data from rows and columns for all three windows. A proportion, e.g. two-thirds to three-fourths of the low-sequency components of the transforms are stored in record at 123.

The automatic training procedure for one key of the prototype keyboard is concluded at 124 and a jump is then made back to 101 to acquire the next key. The entire automatic training phase is completed after the procedure shown in FIG. 9 is gone through for all of the keys on the prototype keyboard. At this time, the disk memory 31 contains all the information about the prototype keyboard needed to inspect production keyboards. The stored information includes the x-y locations of all the keys, sizes and locations of windows, thresholds to be used in detecting the Vup, Vdn, Hup, and Hdn edge data signals, run-length-coded row and column graphics/no graphics data, and Walsh transforms of the edge data.

Reference is now made to FIGS. 10A and 10B for a description of the steps taken by the apparatus during the operations phase when inspecting one key of a production keyboard to determine whether it is exactly the same as the corresponding key on the prototype keyboard or keyboards examined during the automatic training phase described in FIG. 9. After a key is acquired at 130, the file 103 of key addresses is accessed for the address of the particular key, and the x-y table is moved at 132 to position the particular key under the video camera. Step 137 is followed if a window being scanned does not have a graphic pattern, and then the program skips several following unnecessary steps to decision diamond 154 in order to save time and, in the case of an actual apparatus, to be able to complete the inspection of a typical 90-key keyboard in about 45 seconds. If the window does contain a pattern, the program goes on to 140.

At 140, the peak light $P_L$ and peak dark $P_D$ signals from record 107 of the training phase with the prototype are used to compute signal thresholds for the detection of the presence of graphic patterns or absence of graphic patterns, and for the detection of the vertical and horizontal edges of graphic patterns, in one window established during the training phase.

At 142, the record 115 of the prototype or training window is used to compute three vertical overlapping search windows.

Three search windows are used rather than one large search window to avoid including nearby graphics or the edge of the key in the window. These unwanted artifacts would hamper efforts to determine the presence or absence of the graphics of interest.

At 144, the graphics/no graphics row data from the prototype (already in run-length-code) is figuratively moved vertically past the run-length-coded row data obtained in each of the three vertical search windows to find the best and second best vertical match positions and the horizontal scan lines of rows defining the top and bottom boundaries of the matched graphic pattern, in each window.

With the run-length-coded representation, the correlation routine computes the total number of match conditions by simultaneously comparing what amounts to the lengths of the groups of bits from the prototypes string against the lengths of the groups of bits from the product strings. The length of each group is given by its coded representation. When the number of transitions from "1" to "0", and from "0" to "1" in either string is small, compared to the total number of bits, the number of groups of "0"'s and the number of groups of "1"'s is also small. Comparing the groups results in a significant savings in computation time. On the average this technique results in a speedup of 6 to 7 times, compared with the technique of comparing the original bit strings.

The prototype and product string are encoded as follows: moving through a bit string from left to right, a count is maintained of consecutive bits of the same value (0 or 1). When the next bit in the string has a different value, the current count is saved as the next element in the code, and the counter is reset to 0. For example:

Bit String 111100111000 is encoded as: 4 2 3 3 In order to be assured that similar groups of the codes are being compared, i.e. ones to ones and zeros to zeros, the two codes must be synchronized at the start of each search. Hence, the following procedure is implemented. If the two bit strings start with different values, one of the coded strings is shifted one place to the right, and a zero is stored as the first element in that code string. For example:

Prototype String: 111100111000
Product String: 011100011000110010100

Encoded Prototype String: 4 2 3 3
Encoded Product String: 1 3 3 2 3 2 2 1 1 3
Adjusted Product String: 0 1 3 3 2 3 2 2 1 1 3

A shifting procedure is followed repeatedly to obtain every practical alignment of the prototype string and the product string. For each alignment, the number of match conditions is computed. The alignment where the highest number of character matches occurs represents the most likely vertical location of the graphic pattern.

At 146, the vertical locations in the vertical windows where the three best (out of six best and second best matches in the three windows) vertical matches were found are used together with the record at 115 of the prototype window, to compute three corresponding horizontal overlapping search windows.

At 148, the graphics/no graphics run-length coded column data from the prototype is figuratively moved horizontally past the run-length coded data obtained in each of the three horizontal search windows to find the best horizontal match position, and the columns defining the left and right boundaries of the matched graphic patterns, in each window, in the same way as described in connection with box 144.

A quality number describing the closeness with which the prototype row and column data matched the data obtained in each of the three combinations of vertical and horizontal search windows is computed. The one of the three match quality numbers having the highest value identifies the top, bottom, left and right boundaries of the graphic pattern which best matches the prototype pattern.

At 150, if the highest-value combined match quality number is less than a predetermined match threshold number from 149, an error code #1 is sent at 152 to error code, and the program jumps from 154 back to 136 to repeat the steps starting at 140 on another one of the three windows on the key. If the best combined match numbers from 148 exceed the predetermined match threshold 149, the best match graphic boundaries are saved at 156.

At 158, the window borders obtained during training on the prototype keyboard are used to compute the size of the prototype window, and the size limits for the size test are computed.

At 160, the window boundaries to be used for edge extraction are computed from the best match graphic boundaries at 156 and from the size data at 158 and is stored for subsequent use. There a decision is made at 154 to, if necessary, repeat the steps 140 through 160 for the second and third windows of the particular key of the keyboard. When the window boundaries for all three windows of a key have been determined, the program leaves the loop at the "no" output of the decision diamond 154, and goes to 164 in FIG. 10B.

At 164, the key is scanned by the video camera to obtain the peak light $P_L$ and peak dark $P_D$ data and run-length graphics data and edge data, for all three windows.

At 166, the size of the graphic pattern in one window is computed.

At 168, if the prototype window has a blank window, the program jumps to 170 for the performance of blank window tests of the ratio of $P_L$ to $P_D$, or $P_L - P_D$ and a minimum size test. If the window is shown by the tests to be blank at 172, the program jumps out around the following unnecessary steps in the window loop routine to 194, and back to 166 to perform the steps on the next one of the three windows. If the blank window tests at 170 indicate a failure, an error code #6 is sent to the CRT Terminal 10 and the error memory.

If a blank window is not indicated at decision diamond 168, the size of the graphics in the window computed at 166 is compared at 176 with the size limits computed from the prototype at 158, and if the size is incorrect at 178, an error code #2 is sent to the CRT Terminal 10 and error memory. If the window is correct at 178, the program proceeds to 180.

At 180, the horizontal and vertical edge data obtained for the window during the scan of the key is grouped and adjusted in size and compared at 182 with the size of the corresponding data obtained from the prototype at 120. If the size adjustment is not right, an error code #3 is sent at 183 to the CRT Terminal 10 and the error memory. If the size adjustment is correct, the program goes to 184.

At 184, Walsh transforms of the grouped edge data at 180 are computed for comparison with the Walsh transforms computed at 122 from the prototype data.

At 186, if the Walsh transforms do not match, an error code #4 is sent at 188 to the CRT Terminal 10 and to error memory.

At 190, the contrast of the graphics in the window is compared with the contrast of the graphics in the same window of the prototype using the values of $P_L$ and $P_D$.

At 192, if the contrast of the graphics in the windows being inspected is different from the contrast of the prototype, an error code #5 is sent to the CRT Terminal 10 and to the error memory. If the contrast is not the same, the program goes to decision diamond 194 and thence around the loop again to test the two remaining windows. When the program has traversed the loop three times for the three windows of one key being inspected, the program exits from decision diamond 194 back to 130 at the beginning of FIG. 10A for the purpose of acquiring the next key of the keyboard to be inspected for identity with the corresponding key of the prototype keyboard.

The inspection of the keyboard is complete when all three windows in each key have been examined, and all keys in sequence have been examined. The results of the inspection are available at the CRT Terminal display and at the printer 11 which prints out the errors stored in the error code memory during the inspection process.

The described operation of the described apparatus is summarized as follows:

MANUAL TRAINING PHASE

1. Store locations in sequence of all keys,
2. Store sizes and locations of three windows for each key,
3. Store whether graphics in each window are light on dark or dark on light background,
4. Store the degree of tight or loose tolerances to be used when matching signals representing graphics on a production keyboard with signals obtained from the prototype keyboard,
5. Store which windows are blank windows without graphics.

AUTOMATIC TRAINING PHASE

1. Step keys in sequence to positions under video camera using position information stored during manual training phase. During scan of each key, use the video signals generated when the scan passes through the three or more windows preset during the manual training phase, as follows:

2. During four (N) scans of the key, get and store the average peak-light signal $P_L$ and the average peak-dark signal $P_D$ for each of the three windows.

3. Compute and store graphics presence detection threshold and a graphics edge detection threshold, for each window.

4. During four (M) scans of the key, detect rows and columns with graphics G, and with no graphics, NG.

5. Convert the row and column graphics signals G/NG for each window (plus a small border) into run length codes for each window. Store codes in memory.

6. Compute and store the top, bottom, right and left boundaries of the graphics in each window.

7. Use above to compute three tight windows around graphics in the original three windows.

8. Scan the key eight (P) times and use video signals from within the three or more tight windows to detect horizontal and vertical edge signals Hdn, Hup and V along scan rows, and to detect horizontal and vertical edge signals Vdn, Vup and H in the columns.

9. Group the horizontal data H and the vertical data V for each tight window by adding the results from groups of four (Q) consecutive rows and columns.

10. Perform Walsh transforms on above grouped data for each tight window and store a proportion, e.g. two-thirds to three-fourths of the transform components.

Do all steps 2 through 10 on each key of the training keyboard. Then all the necessary information about the training keyboard has been stored for use when inspecting a production keyboard.

OPERATIONAL PHASE

1. Step keys of production keyboard in sequence to positions under video camera using position information stored during manual training phase. During scans of each key, use the video signals generated when the scans pass through the three windows preset during the manual training phase and modified during the automatic training phase, as follows:

2. If window is not supposed or known from the training sample, to be a blank window compute three vertical overlapping search windows from training graphics boundaries.

3. Figuratively move the row graphics data from the training sample vertically past the row data obtained in each of the three vertical search windows to find vertical positions of best match in each search window.

4. Compute three horizontal overlapping search windows from the above and from graphic boundaries of training sample.

5. Figuratively move the column graphics data from the training sample horizontally past the column data obtained in each of the three horizontal search windows to find horizontal position of best match in each search window.

6. If good matches are not found, send error code #1. Otherwise, use vertical and horizontal positions where best matches were found to compute size and location of tight window to use for extracting edge data from the graphic pattern.

7. Repeat steps 2 through 6 for the remaining two windows on the key.

8. Scan tight window for graphic presence and edge data.

9. If window in training sample is blank, test the data obtained and send error code #6 if graphics are found in the window. Otherwise, compare size of graphics and send error code #2 if size of graphics found is different from size of training graphics.

10. Group edge data and adjust size and send error code #3 if size adjustments are not correct.

11. Compute Walsh transform of scanned edge data features and compare with same from training graphics.

12. Send error code #4 if Walsh transforms do not match.

13. Compute contrast (color) difference between scanned graphics and training graphics and send error code #5 if difference is too great.

14. Repeat steps 8 through 13 for remaining two windows.

15. Acquire next key and repeat all of steps 2 through 14 for each key acquired.

The inspection process has been described as one in which feature signals obtained from a pattern on a product key are compared with corresponding feature signals obtained during the training phase from a pattern on a key on only one training sample product. However, the accuracy with which a pattern on a product key can be identified to be the same as the pattern on the training sample key is greatly increased if the signals from the product key are compared with corresponding signals obtained during the training phase from a plurality of training keys.

A prototype Walsh transform feature signal is computed which is an average of the Walsh transform feature signals obtained from corresponding windows on several or more training keys. First, four sets of feature signals are computed for each pattern from the four categories of edge signals shown in FIG. 12: (1) vertical edge counts V, (2) horizontal down and up edge counts Hdn and Hup from row data; and (3) horizontal edge counts H, and (4) vertical down and up edge counts Vdn and Vup from column data. The feature signals from a single training pattern are translated to a point in multi-dimensional feature space, where every feature is represented by one dimension (one component of the feature vector). Then the feature signal points of the several or more prototype patterns are averaged to arrive at an average feature signal point, which is the prototype signal. Next, the distance from the average feature signal point to the individual feature signal point (of an individual training pattern) which is at the greatest Euclidean distance from the average, is computed.

Finally, a match threshold is established which is say, 1.5 times the above computed distance from the average feature signal point. If the feature signal point computed from an inspected pattern on a product key is within the region in the feature space defined by the established match threshold, the inspected pattern is judged to match the prototype.

The match threshold is changed for individual patterns on the keys, as needed, during the training phase. That is, the above mentioned multiplying factor of 1.5 may be reduced to, say, 1.3 for easily matched patterns, and increased to, say, 1.7 for patterns which are found to be more difficult to distinctively represent by the feature signals employed.

The spatial filter 14 is shown in FIG. 5 to include a median filter 33 which replaces a pixel with the median of two previous pixels, the present pixel and two subsequent pixels. The median filter 33 is a one-dimensional, five-point, non-linear filter implemented in hardware and operating at video rates to eliminate spike and speckle noise of 1 or 2 pixel dimensions, and to respond to a valid graphic stroke at least 4 pixels wide. The filter reduces noise without degrading the response to a graphic pattern. The filter is very effective against speckle noise which is characteristic of the surface of the keys under inspection.

The spatial filter 14 also includes a linear filter 39 which performs a one-dimensional, three-point weighted sum of 3 adjacent pixels to aid in smoothing the data. This filter provides smooth transitions at pattern edges and thereby aids in edge detection.

While both filters may be one-dimensional, two-dimensional filters may be substituted if desired.

While the present invention has been described as useful for the inspection of graphic patterns on keys of a keyboard, it should be understood that the invention is also useful for the inspection of circuit components and units and printed wiring on a printed circuit board or the like. Where references are made herein to graphic patterns, the words are intended to include the visual patterns inherent in the sizes, shapes, reflectivities, orientations, etc., of circuit components and units.

What is claimed is:

1. Apparatus for optically inspecting a graphic pattern on a product for identity with the graphic pattern on a previously-examined training sample, comprising:

a video camera, means for positioning a product to be inspected so that said camera scans a rectangular frame portion containing graphic patterns of said product, window gate means operative to define a plurality of electronic window areas within the scanned frame, and to pass the video signal from the camera solely during scans through said window areas, means to manually preset the sizes and locations of said windows so that they closely surround the training graphic pattern, means operative during an inspection of a product to automatically enlarge said windows enough to be sure that said graphic patterns are included therein, and then contract said windows until they closely surround said graphic pattern, said means to enlarge each of said windows including means to compute a plurality of vertically-enlarged overlapping search windows and a plurality of horizontally-enlarged overlapping search windows, video signal processing means operative to translate the video signal passed by said window gate means into representative feature sets of digital signals, and means to compare said feature sets of digital signals with feature sets of digital signals obtained during a previous examination of the corresponding rectangular frame portion of the training sample.

2. The combination as defined in claim 1 wherein said means to contract said windows includes means to find the vertical position of the graphic pattern in the vertically enlarged search windows, and means to find the horizontal position of the graphic in the horizontally-enlarged search windows.

3. The combination as defined in claim 2 wherein said means to contract said windows includes means to generate a run-length-code signal representing the horizontal scan lines in which a graphic pattern is encountered.

4. The combination as defined in claim 3 wherein said means to find the vertical position of the graphic pattern includes means to figuratively move a row run-length-code signal representing a graphic pattern obtained from the prototype vertically to a position of match with a row run-length-code signal obtained from the graphic pattern in the vertically-enlarged search windows.

5. The combination as defined in claim 4 wherein said means to contract said windows includes means to generate a column run-length-code signal representing the vertical columns in which a graphic pattern is encountered.

6. The combination as defined in claim 5 wherein said means to find the horizontal position of the graphic pattern includes means to figuratively move a column run-length-code signal representing a graphic pattern obtained from the training sample horizontally to a position of match with a column run-length-code signal obtained from the graphic pattern in the horizontally-enlarged search windows.

7. The combination as defined in claim 6, and means to compute a match quality number for the degree of match of the product pattern at the most likely location, and to compare the match quality numbers with a threshold to determine whether the product pattern is similar to the prototype pattern.

8. The combination as defined in claim 6, and means utilizing said positions of match to create an electronic window closely surrounding the graphic pattern on the product for use in obtaining said graphic feature signals for comparison with graphic feature signals obtained from the training sample.

9. The combination as defined in claim 8, and means to compute the size of the graphic pattern on the product, and means to compare the computed size with the size of the graphic pattern on the training sample to see if they match.

10. Apparatus for optically inspecting a graphic pattern on a product to see if it matches the graphic pattern of a previously examined training sample, comprising a video camera, a means to position a training product and later a production product, so that the camera scans a rectangular frame portion on the product, window gate means operative to define an electronic window in the frame, and to pass the video signal from said camera solely during scans through said window, video signal processing means operative to translate the video signal passed by said window gate means into row signals including in a first category signals representing the number of each row scan line of vertical edges V, and in a second category signals representing the number of horizontal down edge points Hdn, and the number of horizontal up edge points Hup, and into column signals including in a third category signals representing the number in each column of horizontal edge points H, and signals in a fourth category representing the number of vertical down edge points Vdn, and the number of vertical up edge points Vup, means to compare the V signals, and Hdn and Hup signals, the H signals and the Vdn and Vup signals, obtained from scanning the product pattern, with corresponding signals obtained from scanning the training pattern, said signals in each of the four categories of signals being the averages of signals obtained over a plurality of frame scans, and means to data-reduce said signals by averaging the signals in the first category V, and averaging the signals in the second category Hdn and Hup, over a plurality of successive rows, and by averaging the signals in the third category H, and averaging the signals in the fourth category Vdn and Vup, over a plurality of successive columns.

11. The combination as defined in claim 10 wherein said video processing means includes a spatial filter receptive to the video signal, the spatial filter including, in sequence, a non-linear, five-point median filter to eleminate spike and speckle noise, and a linear filter performing a three-point weighted sum of 3 adjacent pixels to aid in smoothing the signal for reliable edge detection.

12. The combination as defined in claim 10 and means to compute a transform of the signals in each of the four categories.

13. The combination as defined in claim 12 in which said transform is a Walsh transform.

14. The combination as defined in claim 12 and means to compare the low-sequency components of each of the four transforms with corresponding components from the training sample to determine whether the product graphic pattern matches the training graphic pattern.

15. The combination as defined in claim 14 and means to compute the peak light signal $P_L$ and the peak dark $P_D$ signal from the video signal, and means to compare said signals with corresponding signals obtained from the prototype.

16. The combination as defined in claim 12 and means to scan the same pattern on a plurality of training sample products, and to compute a prototype which is an average of the feature signals obtained from all the training samples, for comparison with the feature signal obtained from the production product.

17. The combination as defined in claim 16, and means to compute a match threshold which is more distant in feature space from the prototype than a multiple of the distance of the most distant training sample from the prototype.

18. The combination as defined in claim 17, and means to preset the above multiplying factor for each pattern, to provide a gradation in steps from relatively loose to tight threshold tolerance.

* * * * *